US005632122A

United States Patent [19]
Spinks

[11] Patent Number: 5,632,122
[45] Date of Patent: *May 27, 1997

[54] PUMPABLE DESICCATED MASTIC

[75] Inventor: Anne Spinks, Hugo, Minn.

[73] Assignee: H.B. Fuller Licensing & Financing, Inc., Arden Hills, Minn.

[*] Notice: The term of this patent shall not extend beyond the expiration date of Pat. No. 5,510,416.

[21] Appl. No.: 626,839

[22] Filed: Apr. 2, 1996

Related U.S. Application Data

[63] Continuation-in-part of Ser. No. 31,602, Mar. 15, 1993, Pat. No. 5,510,416.

[51] Int. Cl.$^6$ ........................... E06B 7/12
[52] U.S. Cl. ............... 52/172; 52/171.3; 52/786.13; 156/107; 524/528; 29/469.5; 29/530; 428/34
[58] Field of Search ............... 524/528; 156/107; 52/172, 788, 171.3, 789, 790, 786.13; 29/469.5, 530; 428/34

[56] References Cited

U.S. PATENT DOCUMENTS

| | | | |
|---|---|---|---|
| 3,965,215 | 6/1976 | Lopez et al. | 525/319 |
| 4,045,401 | 8/1977 | Stenmark et al. | 525/197 |
| 4,109,431 | 8/1978 | Mazzoni et al. | 52/172 |
| 4,197,381 | 4/1980 | Alia | 525/222 |
| 4,198,254 | 4/1980 | Laroche et al. | 156/107 |
| 4,226,063 | 10/1980 | Chenel | 52/172 |
| 4,431,691 | 2/1984 | Greenlee | 428/34 |
| 4,622,249 | 11/1986 | Bowser | 428/34 |
| 4,994,309 | 2/1991 | Reichert et al. | 428/34 |

FOREIGN PATENT DOCUMENTS

| | | |
|---|---|---|
| 433386 | 10/1991 | European Pat. Off. . |
| 0475213 | 3/1992 | European Pat. Off. . |
| 60-92379 | 5/1985 | Japan . |

OTHER PUBLICATIONS

ASTM, E 773-88, "Standard Test Methods for Seal Durability of Sealed Insulating Glass Units".
Popular Science, Aug., 1992, "Closing the Gaps in Window Efficiency", By Alex Wilson.
Edgetech, A Division of Lauren, Technical Report, "Super Spacer" By Michael Glover and Gerhard Reichert, Sep., 1989.

*Primary Examiner*—Peter D. Mulcahy
*Attorney, Agent, or Firm*—Vidas, Arrett & Steinkraus, P.A.

[57] ABSTRACT

A pumpable, thermoplastic desiccated mastic capable of desiccating a sealed insulating glass unit. The disclosed compositions comprise:

a resin component consisting essentially of:

4–75 % by weight of the resin component of a film former, the film former consisting essentially of a liquid polybutene polymer, alone or in combination with one or both of a polyisobutylene polymer having a weight average molecular weight of about 35,000 or more, and a butyl rubber having a weight average molecular weight of up to about 500,000, said butyl rubber, if present, representing less than 50% of the film former component;

25–96% by weight of the resin component of a non-crystalline homopolymer, copolymer, terpolymer or graft copolymer comprising polypropylene; and, 0–20% by weight of the resin component of a low volatile UV stable tackifier compatible with the film former and polypropylene components; and an adsorbent component comprising:

at least 20% by weight of the composition of a moisture or moisture and volatile organic chemical adsorbing material; and 0–10% by weight of the composition of an adsorbent of volatile organic compounds, said adsorbent component being present in an amount less than the level which will cause the composition when tested as set forth in ASTM D-1238, Procedure B using a 1100 gram load and an 8 gram sample at 190° C. to provide a melt flow time for a piston travel of 1 inch of more than 60 seconds.

23 Claims, 1 Drawing Sheet

PUMPABLE DESICCATED MASTIC

This application is a continuation-in-part of application 08/031,602, filed Mar. 15, 1993, now U.S. Pat. No. 5,510,416, incorporated herein by reference.

BACKGROUND OF THE INVENTION

In recent years, much work has been done to design spacers for insulating glass units. Metal spacers between opposing panes can conduct heat efficiently so that the insulating performance is substantially reduced. Several alternative spacer designs have been described in *Popular Science*, August 1992 at page 46. Another alternative spacer design which has been developed to provide a highly desirable combination of structural integrity, moisture and gas impermeability and thermal efficiency is described in EP 475,213. This spacer utilizes a metal U-channel separated from the glass panels and the exterior edge of the assembly by a thermal brake. The U-channel opens to the interior of the assembly and includes a moisture permeable adhesive having a desiccant therein on the inner bottom surface of the channel. Adhesive materials having a permeability of greater than 2 gm mm/M$^2$ day as determined by ASTM F-372-73 are recommended. The desiccant loaded adhesive material contemplated for use in the invention has been a polyurethane-based formulation which is formed into a soft string and applied to the U-channel.

It would be an advantage to have a pumpable desiccant loaded formulation which could be more easily applied to the U-channel of the EP 475,213 reference and which would effectively desiccate the insulating glass assembly over its useful life.

Insulating glass assemblies can be subject to accumulation of unsightly chemical "fog" on the interior surface of the glass panels. Fogging can be caused by off-gassing of organic materials in the spacer or from other structures in the interior of the insulating glass assembly such as painted decorative grids. Off-gassing can be caused, for instance, by incompletely dry coatings on such grids or by UV or thermally induced degradation of a polymer during the service life of the insulating glass assembly. Any desiccant loaded material which is utilized in the U-channel of EP 475,213 should not contribute to chemical fogging and, desirably, should effectively adsorb organics originating from other structures within the insulating glass assembly so as to reduce chemical fogging.

The desiccant containing adhesive material utilized in the U-channel structure described in EP 475,213 must also be able to withstand elevated temperature without sagging or creeping and must maintain adhesion to the channel during the service life of the unit. Because the U-channel is open, any sagging, creeping or peeling of the desiccant composition will be readily visible.

These numerous requirements severely limit the options available for formulating a pumpable desiccant loaded material suitable for use in spacer structures of the type disclosed in EP 475,213.

In U.S. Pat. No. 5,510,416, the inventors of the present application disclose thermoplastic hot-melt mastic compositions which simultaneously meet rigorous pumpability, non-fogging, desiccant loading, and non-sag requirements of the open U-channel spacer structure of EP 475,213. Such compositions suitably include a resin component consisting essentially of 4–30 parts by weight of the resin component of a film former selected from the group consisting of polyisobutylene polymers having a weight average molecular weight in the range of about 35,000 to about 60,000, and mixtures of such polymers with minor amounts of a butyl rubber having a weight average molecular weight of up to about 500,000; 20–50 parts by weight of the resin component of a non-crystalline homopolymer, copolymer, terpolymer or graft copolymer comprising polypropylene; and, 0–20 parts by weight of the resin component of a low volatile UV stable tackifier compatible with the film former and polypropylene components; and an adsorbent component which includes at least 20% by weight of the composition of a moisture or moisture and volatile organic chemical adsorbing material; and 0–10% by weight of the composition of an adsorbent of volatile organic compounds.

SUMMARY OF THE INVENTION

The present invention pertains to additional thermoplastic mastic compositions similar to those disclosed in U.S. Pat. No. 5,104,416, but which are further characterized by the inclusion in the resin component of a relatively low molecular weight liquid polybutene polymer as part of the resin component of the formulation. Inclusion of the liquid polybutene polymer makes the formulations more pumpable at comparable desiccant loadings. The compositions adhere well to the U-channel material and do not flow or sag under the normal range of service conditions encountered by an insulating glass assembly. Surprisingly the liquid polybutene containing compositions of the invention can be prepared without causing fogging of the window unit, or causing the material to sag in the window unit and have satisfactory performance on exposure to UV.

The compositions of the invention comprise a mixture of: a resin component consisting essentially of:

4–75% by weight of the resin component of a film former, the film former including a liquid polybutene polymer, alone or in combination with one or both of a polyisobutylene polymer having a weight average molecular weight of about 35,000 or more, and a butyl rubber having a weight average molecular weight of up to about 500,000, said butyl rubber, if present, representing less than 50% of the film former component;

25–96% by weight of the resin component of a non-crystalline homopolymer, copolymer, terpolymer or graft copolymer comprising polypropylene; and, 0–20% by weight of the resin component of a low volatile UV stable tackifier compatible with the film former and polypropylene components; and an adsorbent component comprising:

at least 20% by weight of the composition of a moisture or moisture and volatile organic chemical adsorbing material; and 0–10% by weight of the composition of an adsorbent of volatile organic compounds, said adsorbent component being present in an amount less than the level which will cause the composition, when tested as set forth in ASTM D-1238, Procedure B using a 1100 gram load and an 8 gram sample at 190° C., to provide a melt flow time for a piston travel of 1 inch of more than 60 seconds. Preferred compositions of the invention provide a melt flow time under the specified conditions of less than 5 seconds.

Insulating glass units prepared with the desiccating mastic of the invention and methods of manufacturing edge assemblies for insulating glass units by pumping heated formulations of the invention onto the edge assembly comprise further aspects of the invention disclosed herein.

DETAILED DESCRIPTION OF THE INVENTION

Figure 1:
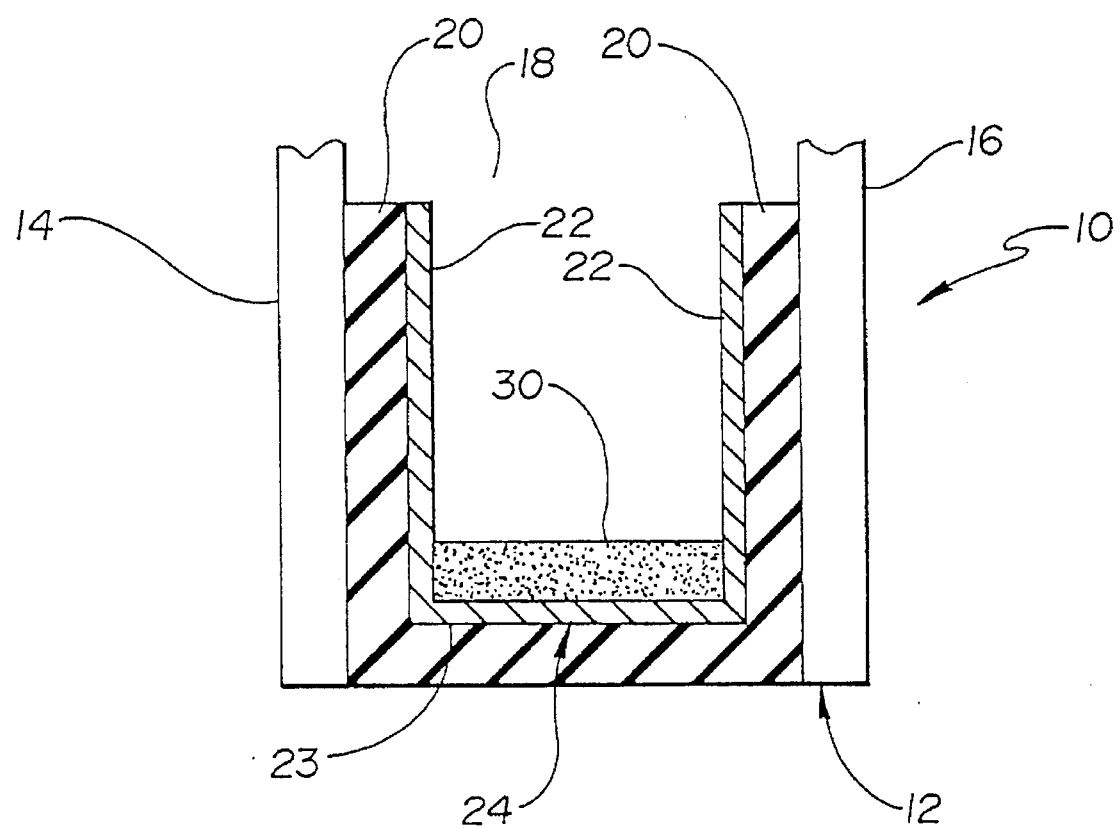
FIG. 1 is a sectional view of the edge assembly of an insulating unit employing a pumpable mastic desiccant of the invention.

Referring to the figure there is shown in FIG. 1 an insulating unit 10, having edge assembly 12 which serves to space the glass sheets 14 and 16 to provide the compartment 18. The edge assembly 12 includes a moisture and/or gas impervious adhesive type sealant layer 20 to adhere the glass sheets 14 and 16 to legs 22, 23 of metal spacer 24. A thin layer of a desiccating formulation 30 of the invention is applied on the inner surface of leg 23 of metal spacer 24 to adsorb moisture in the compartment 18.

Throughout this application quantities given in percentages or parts are to be understood as percentages or parts by weight unless specified otherwise.

As used herein, a composition is considered "pumpable" if, when tested per ASTM D-1238, Procedure B using a 1100 gram load and an 8 gram sample at 190° C. (374° F.), the melt flow time of the composition is no more than 60 seconds. Melt flow time is measured using a 1 inch piston travel as mandated by section 10.1.2.5 of that ASTM procedure. Actual pumping temperatures are considerably lower, typically about 88°–121° C. (190°–250° F.), preferably about 110° C. (230° F.), but this melt flow test is considered to be a good predictor of pumpability with conventional industrial hot melt applicators. Preferably the melt flow time is no more than 15 sec. under the specified conditions.

In some cases, with very pumpable formulations of the invention, the 4 minute wait time of the ASTM test method may result in the composition flowing through the test apparatus before the test is initiated. In such cases the melt time value is considered to be less than 1 second for purposes of this invention. To obtain comparative melt times under such conditions a shorter wait of 1.5 minutes and a lower weight of 725 gm may be used.

To assure that the formulation will stay in place under normal service conditions the compositions should, at minimum show no visible sag or flow when installed in the insulating glass assembly and maintained at a temperature of at least 60° C. (140° F.) for a continuous period of at least 2 weeks. Preferably the formulation will withstand at least 70 C (158° F.) for at least 1 month.

Fogging may be determined in a sealed insulating glass unit per ASTM E-773, using the pass/fail specification of ASTM E-774. However, as a practical matter, a composition which passes the draft test method of ASTM subcommitte C24.15 for Hot Applied Sealants entitled "Standard Test Method For Fogging of Hot Applied Insulating Glass Unit Components", dated Jun. 12, 1994, can be reasonably assured to also pass the specification of ASTM E-774. The C24.15 subcommittee draft test method has been used for testing non-fogging behavior of the inventive compositions.

The formulations of the invention are stable to exposure to UV as determined by no discoloration when exposed in an enclosed box exposure to light from a Sylvania Sunlamp RSM 275W UV bulb at a distance of approximately 12 inches for 72 hours.

The formulations of the invention may be tested for ability to dry an insulating glass unit by frost point determination. The frost point is the temperature at which condensation occurs within the sealed unit. The test method conforms to ASTM E-546. Lowering of the initially obtained frost point over time demonstrates that the formulation effectively removes moisture from the air space of the test panel.

Although described herein in terms of a resin component, an adsorbent component and other additives, it should be understood that this division of ingredients is used only for purposes of stating the relative quantities of ingredients and that an order of mixing of the various ingredients is not implicated thereby. Further, although it is not believed that the compositions of the invention undergo chemical reaction, the mixtures as claimed herein are to be understood as the result of mixture, whether or not some chemical reaction between the specified components takes place upon mixture.

Resin Component

Film Former

The film former component used in the invention provides low temperature flexibility. In accordance with the present invention, the film former includes at least 1%, and up to 100% of the film former component of a liquid polybutene polymer. That is, their pour point as determined by ASTM D-97 is below 70° F. (21° C.). The liquid character of these polymers makes it very surprising that they can be incorporated into the inventive compositions at any levels. Such polymers are copolymers of isobutylene with but-1-ene and/or but-2-ene. Typically these polymers will have a weight average molecular weight of from 370 to about 5000, more preferably from about 900 to about 3000. Such polymers are incorporated into the composition at a level which, taking into account the other ingredients in the resin component of the formulation and the desiccant level employed, produces a formulation which does not sag, does not deteriorate on exposure to UV, does not fog and is pumpable as defined herein. In some formulations this level may be as high as 100% of the film former component, especially for the upper end of the molecular weight range specified. In general it is preferred that the liquid polybutene polymer be employed at a level of 1–50% of the film former component.

Polyisobutylene polymers having a number average molecular weight of about 35,000 or more, preferably 35,000–60,000, most preferably from about 50 to about 56,000, and/or a butyl rubber (weight average molecular weight up to about 500,000) make up the balance of the film former component. If used, the butyl rubber, and any polyisobutylene polymers having weight average molecular weights above 60,000, are desirably limited to an amount no more than 50% of the film former component.

Suitable liquid polybutenes are sold by Amoco under the trademark Indopol®, and by Exxon under the trademark Parapol®. A suitable polyisobutylene product is Vistanex™ LMMH, sold by Exxon. A suitable butyl rubber, if used, is Butyl 268, sold by Exxon.

Propylene Polymer

The propylene polymer functions to give the formulation the cohesive strength and heat resistance necessary for use as a desiccating material in an open U-channel insulating glass assembly of the type shown in FIG. 1. It must have a low volatiles content, be compatible with a film former and must be non-crystalline. Various propylene polymers are suitable such as the Rextac® APO series polymers including Rextac® 2100 series homopolymers, 2500 series ethylene-propylene copolymers and 2700 series butene-propylene copolymers and terpolymers. These products typically have a number average molecular weight ($M_n$) in the range of about 7,000–14,000; weight average molecular weight ($M_w$) in the range of about 35,000–90,000; Z average ($M_z$) in the range of about 13,000–33,000 and polydispersity (MWD) in the range of about 4.9–6.2. Other polymers which may be used are sold under the trademark Eastoflex by Eastman Chemical, such as Eastoflex T1035, a propylene-ethylene-butene terpolymer having a $M_n$ of about 4,000 and a $M_w$ of about 16,000; Eastman D-178; Eastman E 1060; and K-Tac® A-100 amorphous polypropylene sold by Baychem.

Tackifying Resins

The use of a tackifying resin is preferably avoided entirely. It has been found that most tackifiers, even when extensively vacuum stripped, can contribute substantially to chemical fogging. Many tackifiers are also incompatible with the film former/polymer combination used in the invention. In the preferred formulations of the invention, good adhesion to the substrate can be obtained without use of any tackifier. If a tackifying resin is used, it is preferably one which has good UV resistance, low volatiles, and is compatible in the formulation. Hydrogenated wood rosin, such as Foral 105 sold by Hercules, or hydrocarbon tackifying resins, such as Regal Rez 1094 hydrogenated hydrocarbon tackifying resin and Exxon ECR 165C $C_5/C_9$ tackifying resin, are recommended if a tackifier is employed.

Adsorbent Component

The adsorbent component may be one or more of the known moisture adsorbing materials, alone or in combination with adsorbents of low molecular weight organics, such as natural zeolite (e.g. chabasite, gumerinite, levynite, erinite, mordenite and analcite), molecular sieves, silica gel, silica-magnesia gel, silica-alumina gel, activated carbon, activated alumina, etc. At least 20%, preferably at least 30%, by weight of the composition is a moisture adsorbing desiccant. Preferably the desiccant content is between about 30 and 65% by weight of the composition. Suitably, the adsorbent component also includes up to about 10%, preferably 5–10%, of an adsorbent of volatile organics. An adsorbent component which functions to remove both moisture and volatile organics, such as molecular sieve 13x, may also be employed as part or all of the adsorbent component of the formulation. The maximum level of adsorbent is the level at which the composition becomes unpumpable as defined herein. This level may be 70% or higher depending on the particular resin component used and the presence or absence of any filler ingredients. A preferred component is a mixture of about 30–65%, more preferably about 40–60% by weight of the composition of a desiccant such as molecular sieve 3A or 4A and 8–10% by weight of the composition of a desiccant/organic vapor adsorbent, such as molecular sieve 13X. Desirably the desiccant and chemical adsorbent components are in the form of a powder of 50–100 mesh or less.

Other Additives

The formulation may include other common additives such as fillers, antioxidants, UV and thermal stabilizers, adhesion promoters and the like, provided that they do not substantially interfere with the performance of the formulation for its desired purpose. In particular, optional fillers should not increase viscosity of a mastic beyond that practical for pumpability and all other additives must be sufficiently non-volatile to withstand devolatilization of the formulated composition. A suitable extending filler is a calcium carbonate filler, such as Hubercarb™ Q-325 sold by J. M. Huber, which may be employed at levels up to about 10% by weight of the composition, preferably about 5% or less.

Processing

The formulation is suitably made by heating and mixing all ingredients at an elevated temperature, typically 121°–140° C. (250°–284° F.), until a smooth and uniform mixture has been obtained. Higher temperatures may be required when butyl rubber is incorporated into the composition. Devolatilization of the heated formulation may be accomplished before or after addition of the adsorbent. When the adsorbent includes a chemical adsorbent as well as a desiccant, it is desirable that the mixture be devolatilized first, before addition of the adsorbent components. Suitably, the mixture is heated to about 150° C. (302° F.), evacuated to a vacuum pressure of less than 571.8 mm Hg (22 inches Hg) for at least 30 minutes, after which the adsorbent is added and the formulation then subjected to a second stage devolatilization of at least the same extent. The formulated mastic may ben be filtered directly into dry containers which are sealed until use.

The invention is illustrated by reference to the following non-limiting examples.

EXAMPLES

Devolatilized formulations were prepared from the ingredients shown in Table 1 below, where quantities are in parts by weight. Melt flow times as specified above are also provided in Table 1. The Comparative Example is a commercial product prepared in accordance with U.S. Pat. No. 5,510,416. All invention examples pass non-sag, non-fogging and UV stability criteria as described above.

TABLE 1

| Ingredients | Comparative Example | Ex. 1 | Ex. 2 | Ex. 3 | Ex. 4 |
| --- | --- | --- | --- | --- | --- |
| Vistanex ® LMMH | 4.45 | -.- | -.- | -.- | -.- |
| Indopol ® H-100 | -.- | 4.45 | -.- | -.- | -.- |
| Indopol ® H-1500 | -.- | -.- | 4.45 | -.- | -.- |
| Indopol ® H-300 | -.- | -.- | -.- | 4.45 | 4.45 |
| Calcium carbonate | 5.49 | 5.49 | 5.99 | 6.90 | 6.90 |
| Eastman D 178 | 42.74 | 42.74 | 42.74 | 42.74 | 37.74 |
| Irganox 1076 * | 0.50 | 0.50 | -.- | -.- | -.- |
| Carbon Black ** | 0.02 | 0.02 | 0.02 | 0.01 | 0.01 |
| TiO$_2$ ** | 1.80 | 1.80 | 1.80 | 0.90 | 0.90 |
| 3A Mol. sieve | 36.00 | 36.00 | 36.00 | 36.00 | 41.00 |
| 13X Mol. sieve | 9.00 | 9.00 | 9.00 | 9.00 | 9.00 |
| 4A Mol. sieve | -.- | -.- | -.- | -.- | -.- |
| Test Results | | | | | |
| Melt flow time (sec) | | | | | |
| 1100 gm load | 5.1 | | 3 | 2.4 | <1 |
| 725 gm load | 7.6 | | | | 5.3 |

\* Optional antioxidant sold by Ciba Geigy
\*\* Optional component

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:

1. A mastic composition, the composition being thermoplastic and being pumpable, whereby when tested as set forth in ASTM D-1238, Procedure B using a 1100 gram load and an 8 gram sample at 190° C., a melt flow time of no more than 60 seconds for a piston travel of 1 inch is obtained, the composition comprising:

a resin component consisting essentially of:
4–75% by weight of the resin component of a film former, the film former consisting essentially of a liquid polybutene polymer, alone or in combination with one or both of a polyisobutylene polymer having a weight average molecular weight of about 35,000 or more, and a butyl rubber having a weight average molecular weight of up to about 500,000, said butyl rubber, if present, representing less than 50% of the film former component;
25–96% by weight of the resin component of a non-crystalline homopolymer, copolymer, terpolymer or graft copolymer comprising polypropylene; and,
0–20% by weight of the resin component of a low volatile UV stable tackifier compatible with the film former and polypropylene components; and an adsorbent component comprising:
at least 20% by weight of the composition of a moisture or moisture and volatile organic chemical adsorbing material; and 0–10% by weight of the composition of an adsorbent of volatile organic compounds, said adsorbent component being present in an amount less than the level which will cause the composition when tested as set forth in ASTM D-1238, Procedure B using a 1100 gram load and an 8 gram sample at 190° C. to provide a melt flow time for a piston travel of 1 inch of more than 60 seconds.

2. A composition as in claim 1 free of a tackifier.

3. A composition as in claim 1 wherein the film former includes a said said polyisobutylene polymer or a said butyl rubber.

4. A composition as in claim 3 wherein the polyisobutylene polymer has a weight average molecular weight of from about 35,000 to about 60,000.

5. A composition as in claim 1 wherein the polybutene has a number average molecular weight of from about 900 to about 3000.

6. A composition as in claim 1 wherein said polybutene is present at a level of from about 50% to 100% by weight of said film former component.

7. A composition as in claim 1 wherein the propylene polymer is selected from the group consisting of amorphous propylene homopolymers, ethylene-propylene copolymers and butene-propylene copolymers and terpolymers.

8. A composition as in claim 7 wherein the propylene polymer is one having a number average molecular weight of about 4000–7000 and a weight average molecular weight of about 16,000 to about 90,000.

9. A composition as in claim 1 wherein the adsorbent is a mixture of desiccant and volatile organic chemical adsorbing materials.

10. A composition as in claim 9 wherein the adsorbent comprises 20–65% by weight of the composition of a member of the group consisting of molecular sieves 3A and 4A and mixtures thereof, and 5–10% by weight of the composition of molecular sieve 13x.

11. A composition as in claim 9 wherein the adsorbent is in the form of a powder of 100 mesh or less.

12. A composition as in claim 1 wherein said adsorbent component comprises a desiccant in an amount of at least 30% of the composition.

13. A composition as in claim 1 wherein said adsorbent is present in an amount of from about 30% to about 70% of the composition.

14. A composition as in claim 13 wherein said adsorbent component comprises a desiccant in an amount of about 40% to about 60% of the composition.

15. A composition as in claim 14 wherein said adsorbent component further comprises an adsorbent of volatile organic chemicals in an amount of up to about 10% of the composition.

16. A composition as in claim 1 further comprising a filler in an amount of about 10% or less of the composition.

17. A composition as in claim 16 wherein the filler is calcium carbonate and is present at a level of 5% or less of the composition.

18. A composition as in claim 1 wherein the formulation when installed in an insulating glass unit and maintained at a temperature of at least 60° C. for 2 weeks shows no visible sag or flow.

19. A composition as in claim 1 characterized by a melt flow time at 190° C. of no more than 15 seconds.

20. A composition as in claim 19 wherein said melt flow time at 190° C. is no more than 5 seconds.

21. In an insulating glass unit comprising a pair of glass panels and an edge assembly separating and sealingly engaging the panels, the edge assembly and panels defining a sealed interior compartment, the improvement wherein a portion of the edge assembly on the inside of the compartment is coated with a mastic composition as in claim 1.

22. A method of applying a desiccating material to an edge assembly for an insulating glass unit, the edge assembly comprising a U-channel spacer opening into the interior of the insulating glass unit, the method comprising heating a mastic composition as in claim 1 to a temperature of about 88°–121° C. pumping the formulation through an applicator onto the U-channel spacer and allowing the composition to cool to ambient temperature.

23. A method as in claim 22 wherein the application temperature is about 110° C.

* * * * *

UNITED STATES PATENT AND TRADEMARK OFFICE
CERTIFICATE OF CORRECTION

PATENT NO. : 5,632,122
DATED : May 27, 1997
INVENTOR(S) : Anne Spinks

It is certified that error appears in the above-identified patent and that said Letters Patent is hereby corrected as shown below:

Delete columns 1 - 16 and substitute therefor the attached columns 1-8.

Signed and Sealed this

Twenty-fifth Day of November, 1997

Attest:

BRUCE LEHMAN

Attesting Officer

Commissioner of Patents and Trademarks

PUMPABLE DESICCATED MASTIC

This application is a continuation-in-part of application 08/031,602, filed Mar. 15, 1993, now U.S. Pat. No. 5,510,416, incorporated herein by reference.

BACKGROUND OF THE INVENTION

In recent years, much work has been done to design spacers for insulating glass units. Metal spacers between opposing panes can conduct heat efficiently so that the insulating performance is substantially reduced. Several alternative spacer designs have been described in *Popular Science*, August 1992 at page 46. Another alternative spacer design which has been developed to provide a highly desirable combination of structural integrity, moisture and gas impermeability and thermal efficiency is described in EP 475,213. This spacer utilizes a metal U-channel separated from the glass panels and the exterior edge of the assembly by a thermal brake. The U-channel opens to the interior of the assembly and includes a moisture permeable adhesive having a desiccant therein on the inner bottom surface of the channel. Adhesive materials having a permeability of greater than 2 gm mm/M$^2$ day as determined by ASTM F-372-73 are recommended. The desiccant loaded adhesive material contemplated for use in the invention has been a polyurethane-based formulation which is formed into a soft string and applied to the U-channel.

It would be an advantage to have a pumpable desiccant loaded formulation which could be more easily applied to the U-channel of the EP 475,213 reference and which would effectively desiccate the insulating glass assembly over its useful life.

Insulating glass assemblies can be subject to accumulation of unsightly chemical "fog" on the interior surface of the glass panels. Fogging can be caused by off-gassing of organic materials in the spacer or from other structures in the interior of the insulating glass assembly such as painted decorative grids. Off-gassing can be caused, for instance, by incompletely dry coatings on such grids or by UV or thermally induced degradation of a polymer during the service life of the insulating glass assembly. Any desiccant loaded material which is utilized in the U-channel of EP 475,213 should not contribute to chemical fogging and, desirably, should effectively adsorb organics originating from other structures within the insulating glass assembly so as to reduce chemical fogging.

The desiccant containing adhesive material utilized in the U-channel structure described in EP 475,213 must also be able to withstand elevated temperature without sagging or creeping and must maintain adhesion to the channel during the service life of the unit. Because the U-channel is open, any sagging, creeping or peeling of the desiccant composition will be readily visible.

These numerous requirements severely limit the options available for formulating a pumpable desiccant loaded material suitable for use in spacer structures of the type disclosed in EP 475,213.

In U.S. Pat. No. 5,510,416, the inventors of the present application disclose thermoplastic hot-melt mastic compositions which simultaneously meet rigorous pumpability, non-fogging, desiccant loading, and non-sag requirements of the open U-channel spacer structure of EP 475,213. Such compositions suitably include a resin component consisting essentially of 4–30 parts by weight of the resin component of a film former selected from the group consisting of polyisobutylene polymers having a weight average molecular weight in the range of about 35,000 to about 60,000, and mixtures of such polymers with minor amounts of a butyl rubber having a weight average molecular weight of up to about 500,000; 20–50 parts by weight of the resin component of a non-crystalline homopolymer, copolymer, terpolymer or graft copolymer comprising polypropylene; and, 0–20 parts by weight of the resin component of a low volatile UV stable tackifier compatible with the film former and polypropylene components; and an adsorbent component which includes at least 20% by weight of the composition of a moisture or moisture and volatile organic chemical adsorbing material; and 0–10% by weight of the composition of an adsorbent of volatile organic compounds.

SUMMARY OF THE INVENTION

The present invention pertains to additional thermoplastic mastic compositions similar to those disclosed in U.S. Pat. No. 5,104,416, but which are further characterized by the inclusion in the resin component of a relatively low molecular weight liquid polybutene polymer as part of the resin component of the formulation. Inclusion of the liquid polybutene polymer makes the formulations more pumpable at comparable desiccant loadings. The compositions adhere well to the U-channel material and do not flow or sag under the normal range of service conditions encountered by an insulating glass assembly. Surprisingly the liquid polybutene containing compositions of the invention can be prepared without causing fogging of the window unit, or causing the material to sag in the window unit and have satisfactory performance on exposure to UV.

The compositions of the invention comprise a mixture of: a resin component consisting essentially of:

4–75% by weight of the resin component of a film former, the film former including a liquid polybutene polymer, alone or in combination with one or both of a polyisobutylene polymer having a weight average molecular weight of about 35,000 or more, and a butyl rubber having a weight average molecular weight of up to about 500,000, said butyl rubber, if present, representing less than 50% of the film former component;

25–96% by weight of the resin component of a non-crystalline homopolymer, copolymer, terpolymer or graft copolymer comprising polypropylene; and, 0–20% by weight of the resin component of a low volatile UV stable tackifier compatible with the film former and polypropylene components; and an adsorbent component comprising:

at least 20% by weight of the composition of a moisture or moisture and volatile organic chemical adsorbing material; and 0–10% by weight of the composition of an adsorbent of volatile organic compounds, said adsorbent component being present in an amount less than the level which will cause the composition, when tested as set forth in ASTM D-1238, Procedure B using a 1100 gram load and an 8 gram sample at 190° C., to provide a melt flow time for a piston travel of 1 inch of more than 60 seconds. Preferred compositions of the invention provide a melt flow time under the specified conditions of less than 5 seconds.

Insulating glass units prepared with the desiccating mastic of the invention and methods of manufacturing edge assemblies for insulating glass units by pumping heated formulations of the invention onto the edge assembly comprise further aspects of the invention disclosed herein.

DESCRIPTION OF THE FIGURE

FIG. 1 is a sectional view of the edge assembly of an insulating unit employing a pumpable mastic desiccant of the invention.

DETAILED DESCRIPTION OF THE INVENTION

Referring to the figure there is shown in FIG. 1 an insulating unit 10, having edge assembly 12 which serves to space the glass sheets 14 and 16 to provide the compartment 18. The edge assembly 12 includes a moisture and/or gas impervious adhesive type sealant layer 20 to adhere the glass sheets 14 and 16 to legs 22, 23 of metal spacer 24. A thin layer of a desiccating formulation 30 of the invention is applied on the inner surface of leg 23 of metal spacer 24 to adsorb moisture in the compartment 18.

Throughout this application quantities given in percentages or parts are to be understood as percentages or parts by weight unless specified otherwise.

As used herein, a composition is considered "pumpable" if, when tested per ASTM D-1238, Procedure B using a 1100 gram load and an 8 gram sample at 190° C. (374° F.), the melt flow time of the composition is no more than 60 seconds. Melt flow time is measured using a 1 inch piston travel as mandated by section 10.1.2.5 of that ASTM procedure. Actual pumping temperatures are considerably lower, typically about 88°–121° C. (190°–250° F.), preferably about 110° C. (230° F.), but this melt flow test is considered to be a good predictor of pumpability with conventional industrial hot melt applicators. Preferably the melt flow time is no more than 15 sec. under the specified conditions.

In some cases, with very pumpable formulations of the invention, the 4 minute wait time of the ASTM test method may result in the composition flowing through the test apparatus before the test is initiated. In such cases the melt time value is considered to be less than 1 second for purposes of this invention. To obtain comparative melt times under such conditions a shorter wait of 1.5 minutes and a lower weight of 725 gm may be used.

To assure that the formulation will stay in place under normal service conditions the compositions should, at minimum show no visible sag or flow when installed in the insulating glass assembly and maintained at a temperature of at least 60° C. (140° F.) for a continuous period of at least 2 weeks. Preferably the formulation will withstand at least 70 C (158° F.) for at least 1 month.

Fogging may be determined in a sealed insulating glass unit per ASTM E-773, using the pass/fail specification of ASTM E-774. However, as a practical matter, a composition which passes the draft test method of ASTM subcommittee C24.15 for Hot Applied Sealants entitled "Standard Test Method For Fogging of Hot Applied Insulating Glass Unit Components", dated Jun. 12, 1994, can be reasonably assured to also pass the specification of ASTM E-774. The C24.15 subcommittee draft test method has been used for testing non-fogging behavior of the inventive compositions.

The formulations of the invention are stable to exposure to UV as determined by no discoloration when exposed in an enclosed box exposure to light from a Sylvania Sunlamp RSM 275W UV bulb at a distance of approximately 12 inches for 72 hours.

The formulations of the invention may be tested for ability to dry an insulating glass unit by frost point determination. The frost point is the temperature at which condensation occurs within the sealed unit. The test method conforms to ASTM E-546. Lowering of the initially obtained frost point over time demonstrates that the formulation effectively removes moisture from the air space of the test panel.

Although described herein in terms of a resin component, an adsorbent component and other additives, it should be understood that this division of ingredients is used only for purposes of stating the relative quantities of ingredients and that an order of mixing of the various ingredients is not implicated thereby. Further, although it is not believed that the compositions of the invention undergo chemical reaction, the mixtures as claimed herein are to be understood as the result of mixture, whether or not some chemical reaction between the specified components takes place upon mixture.

Resin Component

Film Former

The film former component used in the invention provides low temperature flexibility. In accordance with the present invention, the film former includes at least 1%, and up to 100% of the film former component of a liquid polybutene polymer. That is, their pour point as determined by ASTM D-97 is below 70° F. (21° C.). The liquid character of these polymers makes it very surprising that they can be incorporated into the inventive compositions at any levels. Such polymers are copolymers of isobutylene with but-1-ene and/or but-2-ene. Typically these polymers will have a weight average molecular weight of from 370 to about 5000, more preferably from about 900 to about 3000. Such polymers are incorporated into the composition at a level which, taking into account the other ingredients in the resin component of the formulation and the desiccant level employed, produces a formulation which does not sag, does not deteriorate on exposure to UV, does not fog and is pumpable as defined herein. In some formulations this level may be as high as 100% of the film former component, especially for the upper end of the molecular weight range specified. In general it is preferred that the liquid polybutene polymer be employed at a level of 1–50% of the film former component.

Polyisobutylene polymers having a number average molecular weight of about 35,000 or more, preferably 35,000–60,000, most preferably from about 50 to about 56,000, and/or a butyl rubber (weight average molecular weight up to about 500,000) make up the balance of the film former component. If used, the butyl rubber, and any polyisobutylene polymers having weight average molecular weights above 60,000, are desirably limited to an amount no more than 50% of the film former component.

Suitable liquid polybutenes are sold by Amoco under the trademark Indopol®, and by Exxon under the trademark Parapol®. A suitable polyisobutylene product is Vistanex™ LMMH, sold by Exxon. A suitable butyl rubber, if used, is Butyl 268, sold by Exxon.

Propylene Polymer

The propylene polymer functions to give the formulation the cohesive strength and heat resistance necessary for use as a desiccating material in an open U-channel insulating glass assembly of the type shown in FIG. 1. It must have a low volatiles content, be compatible with a film former and must be non-crystalline. Various propylene polymers are suitable such as the Rextac® APO series polymers including Rextac® 2100 series homopolymers, 2500 series ethylene-propylene copolymers and 2700 series butene-propylene copolymers. These products typically have a number average molecular weight ($M_n$) in the range of about 7,000–14,000; weight average molecular weight ($M_w$) in the range of about 35,000–90,000; Z average ($M_z$) in the range of about 13,000–33,000 and polydispersity (MWD) in the range of about 4.9–6.2. Other polymers which may be used are sold under the trademark Eastoflex by Eastman Chemical, such as Eastoflex T1035, a propylene-ethylene-butene terpolymer having a $M_n$ of about 4,000 and a $M_w$ of about 16,000; Eastman D-178; Eastman E 1060; and K-Tac® A-100 amorphous polypropylene sold by Baychem.

Tackifying Resins

The use of a tackifying resin is preferably avoided entirely. It has been found that most tackifiers, even when extensively vacuum stripped, can contribute substantially to chemical fogging. Many tackifiers are also incompatible with the film former/polymer combination used in the invention. In the preferred formulations of the invention, good adhesion to the substrate can be obtained without use of any tackifier. If a tackifying resin is used, it is preferably one which has good UV resistance, low volatiles, and is compatible in the formulation. Hydrogenated wood rosin, such as Foral 105 sold by Hercules, or hydrocarbon tackifying resins, such as Regal Rez 1094 hydrogenated hydrocarbon tackifying resin and Exxon ECR 165C $C_5/C_9$ tackifying resin, are recommended if a tackifier is employed.

Adsorbent Component

The adsorbent component may be one or more of the known moisture adsorbing materials, alone or in combination with adsorbents of low molecular weight organics, such as natural zeolite (e.g. chabasite, gumerinite, levynite, erinite, mordenite and analcite), molecular sieves, silica gel, silica-magnesia gel, silica-alumina gel, activated carbon, activated alumina, etc. At least 20%, preferably at least 30%, by weight of the composition is a moisture adsorbing desiccant. Preferably the desiccant content is between about 30 and 65% by weight of the composition. Suitably, the adsorbent component also includes up to about 10%, preferably 5–10%, of an adsorbent of volatile organics. An adsorbent component which functions to remove both moisture and volatile organics, such as molecular sieve 13x, may also be employed as part or all of the adsorbent component of the formulation. The maximum level of adsorbent is the level at which the composition becomes unpumpable as defined herein. This level may be 70% or higher depending on the particular resin component used and the presence or absence of any filler ingredients. A preferred component is a mixture of about 30–65%, more preferably about 40–60% by weight of the composition of a desiccant such as molecular sieve 3A or 4A and 8–10% by weight of the composition of a desiccant/organic vapor adsorbent, such as molecular sieve 13X. Desirably the desiccant and chemical adsorbent components are in the form of a powder of 50–100 mesh or less.

Other Additives

The formulation may include other common additives such as fillers, antioxidants, UV and thermal stabilizers, adhesion promoters and the like, provided that they do not substantially interfere with the performance of the formulation for its desired purpose. In particular, optional fillers should not increase viscosity of a mastic beyond that practical for pumpability and all other additives must be sufficiently non-volatile to withstand devolatilization of the formulated composition. A suitable extending filler is a calcium carbonate filler, such as Hubercarb™ Q-325 sold by J. M. Huber, which may be employed at levels up to about 10% by weight of the composition, preferably about 5% or less.

Processing

The formulation is suitably made by heating and mixing all ingredients at an elevated temperature, typically 121°–140° C. (250°–284° F.), until a smooth and uniform mixture has been obtained. Higher temperatures may be required when butyl rubber is incorporated into the composition. Devolatilization of the heated formulation may be accomplished before or after addition of the adsorbent. When the adsorbent includes a chemical adsorbent as well as a desiccant, it is desirable that the mixture be devolatilized first, before addition of the adsorbent components. Suitably, the mixture is heated to about 150° C. (302° F.), evacuated to a vacuum pressure of less than 571.8 mm Hg (22 inches Hg) for at least 30 minutes, after which the adsorbent is added and the formulation then subjected to a second stage devolatilization of at least the same extent. The formulated mastic may ben be filtered directly into dry containers which are sealed until use.

The invention is illustrated by reference to the following non-limiting examples.

EXAMPLES

Devolatilized formulations were prepared from the ingredients shown in Table 1 below, where quantities are in parts by weight. Melt flow times as specified above are also provided in Table 1. The Comparative Example is a commercial product prepared in accordance with U.S. Pat. No. 5,510,416. All invention examples pass non-sag, non-fogging and UV stability criteria as described above.

TABLE 1

| Ingredients | Comparative Example | Ex. 1 | Ex. 2 | Ex. 3 | Ex. 4 |
|---|---|---|---|---|---|
| Vistanex ® LMMH | 4.45 | -- | -- | -- | -- |
| Indopol ® H-100 | -- | 4.45 | -- | -- | -- |
| Indopol ® H-1500 | -- | -- | 4.45 | -- | -- |
| Indopol ® H-300 | -- | -- | -- | 4.45 | 4.45 |
| Calcium carbonate | 5.49 | 5.49 | 5.99 | 6.90 | 6.90 |
| Eastman D 178 | 42.74 | 42.74 | 42.74 | 42.74 | 37.74 |
| Irganox 1076 * | 0.50 | 0.50 | -- | -- | -- |
| Carbon Black ** | 0.02 | 0.02 | 0.02 | 0.01 | 0.01 |
| TiO$_2$ ** | 1.80 | 1.80 | 1.80 | 0.90 | 0.90 |
| 3A Mol. sieve | 36.00 | 36.00 | 36.00 | 36.00 | 41.00 |
| 13X Mol. sieve | 9.00 | 9.00 | 9.00 | 9.00 | 9.00 |
| 4A Mol. sieve | -- | -- | -- | -- | -- |
| Test Results | | | | | |
| Melt flow time (sec) | | | | | |
| 1100 gm load | 5.1 | 3 | 2.4 | ◁ | |
| 725 gm load | 7.6 | | | | 5.3 |

\* Optional antioxidant sold by Ciba Geigy
\*\* Optional component

Although the present invention has been described in terms of specific embodiments, it is anticipated that alterations and modifications thereof will no doubt become apparent to those skilled in the art. It is therefore intended that the following claims be interpreted as covering all such alterations and modifications as fall within the true spirit and scope of the invention.

I claim:
1. A mastic composition, the composition being thermoplastic and being pumpable, whereby when tested as set forth in ASTM D-1238, Procedure B using a 1100 gram load and an 8 gram sample at 190° C., a melt flow time of no more than 60 seconds for a piston travel of 1 inch is obtained, the composition comprising:

a resin component consisting essentially of:
4–75% by weight of the resin component of a film former, the film former consisting essentially of a liquid polybutene polymer, alone or in combination with one or both of a polyisobutylene polymer having a weight average molecular weight of about 35,000 or more, and a butyl rubber having a weight average molecular weight of up to about 500,000, said butyl rubber, if present, representing less than 50% of the film former component;

25–96% by weight of the resin component of a non-crystalline homopolymer, copolymer, terpolymer or graft copolymer comprising polypropylene; and, 0–20% by weight of the resin component of a low volatile UV stable tackifier compatible with the film former and polypropylene components; and an adsorbent component comprising:
at least 20% by weight of the composition of a moisture or moisture and volatile organic chemical adsorbing material; and 0–10% by weight of the composition of an adsorbent of volatile organic compounds, said adsorbent component being present in an amount less than the level which will cause the composition when tested as set forth in ASTM D-1238, Procedure B using a 1100 gram load and an 8 gram sample at 190° C. to provide a melt flow time for a piston travel of 1 inch of more than 60 seconds.

2. A composition as in claim 1 free of a tackifier.

3. A composition as in claim 1 wherein the film former includes a said said polyisobutylene polymer or a said butyl rubber.

4. A composition as in claim 3 wherein the polyisobutylene polymer has a weight average molecular weight of from about 35,000 to about 60,000.

5. A composition as in claim 1 wherein the polybutene has a number average molecular weight of from about 900 to about 3000.

6. A composition as in claim 1 wherein said polybutene is present at a level of from about 50% to 100% by weight of said film former component.

7. A composition as in claim 1 wherein the propylene polymer is selected from the group consisting of amorphous propylene homopolymers, ethylene-propylene copolymers and butene-propylene copolymers and terpolymers.

8. A composition as in claim 7 wherein the propylene polymer is one having a number average molecular weight of about 4000–7000 and a weight average molecular weight of about 16,000 to about 90,000.

9. A composition as in claim 1 wherein the adsorbent is a mixture of desiccant and volatile organic chemical adsorbing materials.

10. A composition as in claim 9 wherein the adsorbent comprises 20–65% by weight of the composition of a member of the group consisting of molecular sieves 3A and 4A and mixtures thereof, and 5–10% by weight of the composition of molecular sieve 13x.

11. A composition as in claim 9 wherein the adsorbent is in the form of a powder of 100 mesh or less.

12. A composition as in claim 1 wherein said adsorbent component comprises a desiccant in an amount of at least 30% of the composition.

13. A composition as in claim 1 wherein said adsorbent is present in an amount of from about 30% to about 70% of the composition.

14. A composition as in claim 13 wherein said adsorbent component comprises a desiccant in an amount of about 40% to about 60% of the composition.

15. A composition as in claim 14 wherein said adsorbent component further comprises an adsorbent of volatile organic chemicals in an amount of up to about 10% of the composition.

16. A composition as in claim 1 further comprising a filler in an amount of about 10% or less of the composition.

17. A composition as in claim 16 wherein the filler is calcium carbonate and is present at a level of 5% or less of the composition.

18. A composition as in claim 1 wherein the formulation when installed in an insulating glass unit and maintained at a temperature of at least 60° C. for 2 weeks shows no visible sag or flow.

19. A composition as in claim 1 characterized by a melt flow time at 190° C. of no more than 15 seconds.

20. A composition as in claim 19 wherein said melt flow time at 190° C. is no more than 5 seconds.

21. In an insulating glass unit comprising a pair of glass panels and an edge assembly separating and sealingly engaging the panels, the edge assembly and panels defining a sealed interior compartment, the improvement wherein a portion of the edge assembly on the inside of the compartment is coated with a mastic composition as in claim 1.

22. A method of applying a desiccating material to an edge assembly for an insulating glass unit, the edge assembly comprising a U-channel spacer opening into the interior of the insulating glass unit, the method comprising heating a mastic composition as in claim 1 to a temperature of about 88°–121° C., pumping the formulation through an applicator onto the U-channel spacer and allowing the composition to cool to ambient temperature.

23. A method as in claim 22 wherein the application temperature is about 110° C.

* * * * *

SEQUENCE LISTING ( 1 ) GENERAL INFORMATION:

( i i i ) NUMBER OF SEQUENCES: 5

( 2 ) INFORMATION FOR SEQ ID NO:1:

( i ) SEQUENCE CHARACTERISTICS:
        ( A ) LENGTH: 1539 base pairs
        ( B ) TYPE: nucleic acid
        ( C ) STRANDEDNESS: single
        ( D ) TOPOLOGY: linear ( i i ) MOLECULE TYPE: cDNA ( i i i ) HYPOTHETICAL: NO ( i v ) ANTI-SENSE: NO ( i x ) FEATURE:
        ( A ) NAME/KEY: CDS
        ( B ) LOCATION: 1..1539

( x i ) SEQUENCE DESCRIPTION: SEQ ID NO:1:

```
ATG GAC CTC AAG GAA AGC CCC AGT GAG GGC AGC CTG CAA CCT TCT AGC    48
Met Asp Leu Lys Glu Ser Pro Ser Glu Gly Ser Leu Gln Pro Ser Ser
 1               5                  10                  15

ATC CAG ATC TTT GCC AAC ACC TCC ACC CTC CAT GGC ATC CGC CAC ATC    96
Ile Gln Ile Phe Ala Asn Thr Ser Thr Leu His Gly Ile Arg His Ile
                20                  25                  30

TTC GTG TAT GGG CCG CTG ACC ATC CGG CGT GTG CTG TGG GCA GTG GCC   144
Phe Val Tyr Gly Pro Leu Thr Ile Arg Arg Val Leu Trp Ala Val Ala
            35                  40                  45

TTC GTG GGC TCT CTG GGC CTG CTG CTG GTG GAG AGC TCT GAG AGG GTG   192
Phe Val Gly Ser Leu Gly Leu Leu Leu Val Glu Ser Ser Glu Arg Val
        50                  55                  60

TCC TAC TAC TTC TCC TAC CAG CAT GTC ACT AAG GTG GAC GAA GTG GTG   240
Ser Tyr Tyr Phe Ser Tyr Gln His Val Thr Lys Val Asp Glu Val Val
65                  70                  75                  80

GCT CAA AGC CTG GTC TTC CCA GCT GTG ACC CTC TGT AAC CTC AAT GGC   288
Ala Gln Ser Leu Val Phe Pro Ala Val Thr Leu Cys Asn Leu Asn Gly
                85                  90                  95

TTC CGG TTC TCC AGG CTC ACC ACC AAC GAC CTG TAC CAT GCT GGG GAG   336
Phe Arg Phe Ser Arg Leu Thr Thr Asn Asp Leu Tyr His Ala Gly Glu
                100                 105                 110

CTG CTG GCC CTG CTG GAT GTC AAC CTG CAG ATC CCG GAC CCC CAT CTG   384
Leu Leu Ala Leu Leu Asp Val Asn Leu Gln Ile Pro Asp Pro His Leu
            115                 120                 125

GCT GAC CCC TCC GTG CTG GAG GCC CTG CGG CAG AAG GCC AAC TTC AAG   432
Ala Asp Pro Ser Val Leu Glu Ala Leu Arg Gln Lys Ala Asn Phe Lys
        130                 135                 140

CAC TAC AAA CCC AAG CAG TTC AGC ATG CTG GAG TTC CTG CAC CGT GTG   480
His Tyr Lys Pro Lys Gln Phe Ser Met Leu Glu Phe Leu His Arg Val
145                 150                 155                 160

GGC CAT GAC CTG AAG GAT ATG ATG CTC TAC TGC AAG TTC AAA GGG CAG   528
Gly His Asp Leu Lys Asp Met Met Leu Tyr Cys Lys Phe Lys Gly Gln
                165                 170                 175

GAG TGC GGC CAC CAA GAC TTC ACC ACA GTG TTT ACA AAA TAT GGG AAG   576
Glu Cys Gly His Gln Asp Phe Thr Thr Val Phe Thr Lys Tyr Gly Lys
                180                 185                 190

TGT TAC ATG TTT AAC TCA GGC GAG GAT GGC AAA CCT CTG CTC ACC ACG   624
Cys Tyr Met Phe Asn Ser Gly Glu Asp Gly Lys Pro Leu Leu Thr Thr
            195                 200                 205
```

-continued

```
GTC AAG GGG GGG ACA GGC AAC GGG CTG GAG ATC ATG CTG GAC ATT CAG    672
Val Lys Gly Gly Thr Gly Asn Gly Leu Glu Ile Met Leu Asp Ile Gln
    210                 215                 220

CAG GAT GAG TAC CTG CCC ATC TGG GGA GAG ACA GAG GAA ACG ACA TTT    720
Gln Asp Glu Tyr Leu Pro Ile Trp Gly Glu Thr Glu Glu Thr Thr Phe
225                 230                 235                 240

GAA GCA GGA GTG AAA GTT CAG ATC CAC AGT CAG TCT GAG CCA CCT TTC    768
Glu Ala Gly Val Lys Val Gln Ile His Ser Gln Ser Glu Pro Pro Phe
                245                 250                 255

ATC CAA GAG CTG GGC TTT GGG GTG GCT CCA GGG TTC CAG ACC TTT GTG    816
Ile Gln Glu Leu Gly Phe Gly Val Ala Pro Gly Phe Gln Thr Phe Val
                    260                 265                 270

GCC ACA CAG GAG CAG AGG CTC ACA TAC CTG CCC CCA CCG TGG GGT GAG    864
Ala Thr Gln Glu Gln Arg Leu Thr Tyr Leu Pro Pro Pro Trp Gly Glu
            275                 280                 285

TGC CGA TCC TCA GAG ATG GGC CTC GAC TTT TTT CCT GTT TAC AGC ATC    912
Cys Arg Ser Ser Glu Met Gly Leu Asp Phe Phe Pro Val Tyr Ser Ile
    290                 295                 300

ACC GCC TGT AGG ATT GAC TGT GAG ACC CGC TAC ATT GTG GAA AAC TGC    960
Thr Ala Cys Arg Ile Asp Cys Glu Thr Arg Tyr Ile Val Glu Asn Cys
305                 310                 315                 320

AAC TGC CGC ATG GTT CAC ATG CCA GGG GAT GCC CCT TTT TGT ACC CCT   1008
Asn Cys Arg Met Val His Met Pro Gly Asp Ala Pro Phe Cys Thr Pro
                325                 330                 335

GAG CAG CAC AAG GAG TGT GCA GAG CCT GCC CTA GGT CTG TTG GCG GAA   1056
Glu Gln His Lys Glu Cys Ala Glu Pro Ala Leu Gly Leu Leu Ala Glu
                    340                 345                 350

AAG GAC AGC AAT TAC TGT CTC TGC AGG ACA CCC TGC AAC CTA ACC CGC   1104
Lys Asp Ser Asn Tyr Cys Leu Cys Arg Thr Pro Cys Asn Leu Thr Arg
            355                 360                 365

TAC AAC AAA GAG CTC TCC ATG GTG AAG ATC CCC AGC AAG ACA TCA GCC   1152
Tyr Asn Lys Glu Leu Ser Met Val Lys Ile Pro Ser Lys Thr Ser Ala
    370                 375                 380

AAG TAC CTT GAG AAG AAA TTT AAC AAA TCA GAA AAA TAT ATC TCA GAG   1200
Lys Tyr Leu Glu Lys Lys Phe Asn Lys Ser Glu Lys Tyr Ile Ser Glu
385                 390                 395                 400

AAC ATC CTT GTT CTG GAT ATA TTT TTT GAA GCT CTC AAT TAT GAG ACA   1248
Asn Ile Leu Val Leu Asp Ile Phe Phe Glu Ala Leu Asn Tyr Glu Thr
                405                 410                 415

ATT GAA CAG AAG AAG GCG TAT GAA GTT GCT GCC TTA CTT GGT GAT ATT   1296
Ile Glu Gln Lys Lys Ala Tyr Glu Val Ala Ala Leu Leu Gly Asp Ile
                    420                 425                 430

GGT GGT CAG ATG GGA TTG TTC ATT GGT GCT AGT ATC CTT ACA ATA CTA   1344
Gly Gly Gln Met Gly Leu Phe Ile Gly Ala Ser Ile Leu Thr Ile Leu
            435                 440                 445

GAG CTC TTT GAT TAT ATT TAT GAG CTG ATC AAA GAG AAG CTA TTA GAC   1392
Glu Leu Phe Asp Tyr Ile Tyr Glu Leu Ile Lys Glu Lys Leu Leu Asp
    450                 455                 460

CTG CTT GGC AAA GAG GAG GAC GAA GGG AGC CAC GAT GAG AAT GTG AGT   1440
Leu Leu Gly Lys Glu Glu Asp Glu Gly Ser His Asp Glu Asn Val Ser
465                 470                 475                 480

ACT TGT GAC ACA ATG CCA AAC CAC TCT GAA ACC ATC AGT CAC GCT GTG   1488
Thr Cys Asp Thr Met Pro Asn His Ser Glu Thr Ile Ser His Ala Val
                485                 490                 495

AAC GTG CCC CTG CAG ACG ACC CTG GGG ACC TTG GAG GAG ATT GCC TGC   1536
Asn Val Pro Leu Gln Thr Thr Leu Gly Thr Leu Glu Glu Ile Ala Cys
                500                 505                 510

TGA                                                                1539
```

( 2 ) INFORMATION FOR SEQ ID NO:2:

(i) SEQUENCE CHARACTERISTICS:
 (A) LENGTH: 512 amino acids
 (B) TYPE: amino acid
 (D) TOPOLOGY: linear (ii) MOLECULE TYPE: protein (xi) SEQUENCE DESCRIPTION: SEQ ID NO:2:

```
Met Asp Leu Lys Glu Ser Pro Ser Glu Gly Ser Leu Gln Pro Ser Ser
  1               5                  10                  15

Ile Gln Ile Phe Ala Asn Thr Ser Thr Leu His Gly Ile Arg His Ile
             20                  25                  30

Phe Val Tyr Gly Pro Leu Thr Ile Arg Arg Val Leu Trp Ala Val Ala
         35                  40                  45

Phe Val Gly Ser Leu Gly Leu Leu Leu Val Glu Ser Ser Glu Arg Val
     50                  55                  60

Ser Tyr Tyr Phe Ser Tyr Gln His Val Thr Lys Val Asp Glu Val Val
 65                  70                  75                  80

Ala Gln Ser Leu Val Phe Pro Ala Val Thr Leu Cys Asn Leu Asn Gly
                 85                  90                  95

Phe Arg Phe Ser Arg Leu Thr Thr Asn Asp Leu Tyr His Ala Gly Glu
             100                 105                 110

Leu Leu Ala Leu Leu Asp Val Asn Leu Gln Ile Pro Asp Pro His Leu
         115                 120                 125

Ala Asp Pro Ser Val Leu Glu Ala Leu Arg Gln Lys Ala Asn Phe Lys
     130                 135                 140

His Tyr Lys Pro Lys Gln Phe Ser Met Leu Glu Phe Leu His Arg Val
145                 150                 155                 160

Gly His Asp Leu Lys Asp Met Met Leu Tyr Cys Lys Phe Lys Gly Gln
                 165                 170                 175

Glu Cys Gly His Gln Asp Phe Thr Thr Val Phe Thr Lys Tyr Gly Lys
             180                 185                 190

Cys Tyr Met Phe Asn Ser Gly Glu Asp Gly Lys Pro Leu Leu Thr Thr
         195                 200                 205

Val Lys Gly Gly Thr Gly Asn Gly Leu Glu Ile Met Leu Asp Ile Gln
     210                 215                 220

Gln Asp Glu Tyr Leu Pro Ile Trp Gly Glu Thr Glu Glu Thr Thr Phe
225                 230                 235                 240

Glu Ala Gly Val Lys Val Gln Ile His Ser Gln Ser Glu Pro Pro Phe
                 245                 250                 255

Ile Gln Glu Leu Gly Phe Gly Val Ala Pro Gly Phe Gln Thr Phe Val
             260                 265                 270

Ala Thr Gln Glu Gln Arg Leu Thr Tyr Leu Pro Pro Pro Trp Gly Glu
         275                 280                 285

Cys Arg Ser Ser Glu Met Gly Leu Asp Phe Phe Pro Val Tyr Ser Ile
     290                 295                 300

Thr Ala Cys Arg Ile Asp Cys Glu Thr Arg Tyr Ile Val Glu Asn Cys
305                 310                 315                 320

Asn Cys Arg Met Val His Met Pro Gly Asp Ala Pro Phe Cys Thr Pro
                 325                 330                 335

Glu Gln His Lys Glu Cys Ala Glu Pro Ala Leu Gly Leu Leu Ala Glu
             340                 345                 350

Lys Asp Ser Asn Tyr Cys Leu Cys Arg Thr Pro Cys Asn Leu Thr Arg
         355                 360                 365

Tyr Asn Lys Glu Leu Ser Met Val Lys Ile Pro Ser Lys Thr Ser Ala
```

|       |       |       |       | 370   |       |       |       | 375   |       |       |       | 380   |       |       |       |
|-------|-------|-------|-------|-------|-------|-------|-------|-------|-------|-------|-------|-------|-------|-------|-------|

Lys Tyr Leu Glu Lys Lys Phe Asn Lys Ser Glu Lys Tyr Ile Ser Glu
385                     390                 395                 400

Asn Ile Leu Val Leu Asp Ile Phe Phe Glu Ala Leu Asn Tyr Glu Thr
                405                 410                 415

Ile Glu Gln Lys Lys Ala Tyr Glu Val Ala Ala Leu Leu Gly Asp Ile
                420                 425                 430

Gly Gly Gln Met Gly Leu Phe Ile Gly Ala Ser Ile Leu Thr Ile Leu
                435             440                 445

Glu Leu Phe Asp Tyr Ile Tyr Glu Leu Ile Lys Glu Lys Leu Leu Asp
        450             455                 460

Leu Leu Gly Lys Glu Glu Asp Glu Gly Ser His Asp Glu Asn Val Ser
465                 470                 475                 480

Thr Cys Asp Thr Met Pro Asn His Ser Glu Thr Ile Ser His Ala Val
                485                 490                 495

Asn Val Pro Leu Gln Thr Thr Leu Gly Thr Leu Glu Glu Ile Ala Cys
            500                 505                 510

( 2 ) INFORMATION FOR SEQ ID NO:3:

( i ) SEQUENCE CHARACTERISTICS:
        ( A ) LENGTH: 4 amino acids
        ( B ) TYPE: amino acid
        ( C ) STRANDEDNESS:
        ( D ) TOPOLOGY: linear ( i i ) MOLECULE TYPE: peptide ( x i ) SEQUENCE DESCRIPTION: SEQ ID NO:3:

Phe Met Arg Phe
1

( 2 ) INFORMATION FOR SEQ ID NO:4:

( i ) SEQUENCE CHARACTERISTICS:
        ( A ) LENGTH: 8 amino acids
        ( B ) TYPE: amino acid
        ( C ) STRANDEDNESS:
        ( D ) TOPOLOGY: linear ( i i ) MOLECULE TYPE: peptide ( x i ) SEQUENCE DESCRIPTION: SEQ ID NO:4:

Phe Leu Phe Gln Pro Gln Arg Phe
1               5

( 2 ) INFORMATION FOR SEQ ID NO:5:

( i ) SEQUENCE CHARACTERISTICS:
        ( A ) LENGTH: 18 amino acids
        ( B ) TYPE: amino acid
        ( C ) STRANDEDNESS:
        ( D ) TOPOLOGY: linear ( i i ) MOLECULE TYPE: peptide ( x i ) SEQUENCE DESCRIPTION: SEQ ID NO:5:

Ala Gly Glu Gly Leu Ser Ser Pro Phe Trp Ser Leu Ala Ala Pro Gln
1               5                   10                  15

Arg Phe